US010020597B2

(12) United States Patent
Schneider et al.

(10) Patent No.: US 10,020,597 B2
(45) Date of Patent: Jul. 10, 2018

(54) ELECTRICAL CONNECTION ELEMENT FOR FASTENING, IN PARTICULAR SOLDERING, TO A GLASS PANE, AND RIBBON LITZ WIRE MIXED BRAID

(71) Applicant: FEW Fahrzeugelektrikwerk GmbH & Co. KG, Zwenkau (DE)

(72) Inventors: Björn Schneider, Leipzig (DE); André Jenrich, Leipzig (DE); Werner Hartmann, Leipzig (DE)

(73) Assignee: FEW Fahrzeugelektrikwerk GmbH & Co. KG, Zwenkau (DE)

( * ) Notice: Subject to any disclaimer, the term of this patent is extended or adjusted under 35 U.S.C. 154(b) by 0 days.

(21) Appl. No.: 15/310,265

(22) PCT Filed: May 21, 2015

(86) PCT No.: PCT/EP2015/061207
§ 371 (c)(1),
(2) Date: Nov. 10, 2016

(87) PCT Pub. No.: WO2015/177260
PCT Pub. Date: Nov. 26, 2015

(65) Prior Publication Data
US 2017/0264024 A1 Sep. 14, 2017

(30) Foreign Application Priority Data

May 23, 2014 (DE) .................... 20 2014 004 267 U

(51) Int. Cl.
H01B 7/20 (2006.01)
H01R 4/02 (2006.01)
H01R 43/02 (2006.01)
H01B 1/02 (2006.01)
H01B 5/08 (2006.01)
B60R 16/03 (2006.01)
B60S 1/02 (2006.01)
H05B 3/84 (2006.01)

(52) U.S. Cl.
CPC .............. *H01R 4/029* (2013.01); *H01B 1/02* (2013.01); *H01B 5/08* (2013.01); *H01R 43/0214* (2013.01); *B60R 16/03* (2013.01); *B60S 1/026* (2013.01); *H01R 2201/26* (2013.01); *H05B 3/84* (2013.01); *H05B 2203/016* (2013.01)

(58) Field of Classification Search
CPC ...... H01R 43/0207; H01R 4/187; H01R 4/02; H01R 4/023; H01R 4/04; H05B 3/86; H05B 3/84; B32B 17/10036; B32B 17/10018
USPC ......... 174/74 R, 75 R, 94 R, 84 R, 255, 257, 174/117 F; 439/371, 874; 219/203, 202
See application file for complete search history.

(56) References Cited

U.S. PATENT DOCUMENTS

| | | | | |
|---|---|---|---|---|
| 2,257,649 A * | 9/1941 | Pierce | ................... | B60C 9/0042 87/1 |
| 2,644,066 A * | 6/1953 | Glynn | ...................... | H05B 3/84 29/517 |
| 3,674,570 A * | 7/1972 | Hallstrom et al. | ........ | B21C 9/00 148/576 |
| 4,719,317 A * | 1/1988 | Reynolds | ................. | H01R 4/04 174/94 R |
| 5,596,335 A * | 1/1997 | Dishart | ............. | B32B 17/10036 343/713 |
| 5,738,554 A * | 4/1998 | Borger | ..................... | H01R 4/02 219/203 |
| 6,730,848 B1 * | 5/2004 | Antaya | ................ | B23K 1/0008 174/117 F |
| 6,870,134 B2 * | 3/2005 | Sol | .................... | B32B 17/10036 219/203 |
| 6,906,287 B2 * | 6/2005 | Sol | .................... | B32B 17/10036 15/250.05 |
| 7,134,201 B2 * | 11/2006 | Ackerman | ......... | H01R 43/0207 219/203 |
| 7,301,126 B2 * | 11/2007 | Mann | ................ | B32B 17/10018 219/202 |
| 8,905,778 B2 * | 12/2014 | Jenrich | .................... | H05B 3/86 439/371 |
| 9,155,206 B2 * | 10/2015 | Rateiczak | ................ | H05B 3/84 |
| 9,425,517 B2 | 8/2016 | Schlarb et al. | | |

(Continued)

FOREIGN PATENT DOCUMENTS

| | | | | |
|---|---|---|---|---|
| DE | 691 02 964 T2 | 2/1995 | ............... | H01R 4/02 |
| DE | 695 14 199 T2 | 6/2000 | ............... | H01R 4/02 |

(Continued)

OTHER PUBLICATIONS

Data Sheet of King Precision Wire Company, Data Sheets of 400 Series Stainless Steel, Aug. 24, 2010.*

The Notification Concerning Transmittal of International Preliminary Report on Patentability (Chapter I of the Patent Cooperation Treaty), in English, dated Dec. 8, 2016, which was issued by the International Bureau of WIPO in Applicant's corresponding international PCT application having Serial No. PCT/EP2015/061207, filed on May 21, 2015.

The English translation of the International Preliminary Report on Patentability (Chapter I of the Patent Cooperation Treaty), dated Nov. 29, 2016, which was issued by the International Bureau of WIPO in Applicant's corresponding international PCT application having Serial No. PCT/EP2015/061207, filed on May 21, 2015.

(Continued)

*Primary Examiner* — William H Mayo, III
(74) *Attorney, Agent, or Firm* — Bodner & O'Rourke, LLP; Gerald T. Bodner; Christian P. Bodner

(57) ABSTRACT

An electrical connection element for fastening, in particular soldering, to a glass pane and conductive sections present there, in particular to a vehicle pane, consisting of a solder connection part and a ribbon litz wire section fixed to the solder connection part by welding. The ribbon litz wire section consists of a mixed braid which, in addition to single wires made of copper or a copper alloy, contains single wires made of a material which has a melting temperature that corresponds substantially to the melting temperature of the solder connection part or has a higher melting temperature than the latter.

14 Claims, No Drawings

(56) References Cited

U.S. PATENT DOCUMENTS

| | | | | |
|---|---|---|---|---|
| 2002/0005398 | A1* | 1/2002 | Gillner | B32B 17/10036 219/203 |
| 2002/0129873 | A1* | 9/2002 | Havette | C21D 8/12 148/111 |
| 2006/0102610 | A1* | 5/2006 | Hoepfner | H05B 3/84 219/203 |
| 2009/0170380 | A1* | 7/2009 | Lyon | B32B 17/10036 439/874 |
| 2009/0277671 | A1* | 11/2009 | Hahn | B32B 17/10036 174/257 |
| 2012/0305311 | A1* | 12/2012 | Jenrich | H01R 4/023 174/75 R |
| 2012/0318566 | A1* | 12/2012 | Reul | H05B 3/84 174/255 |
| 2013/0043066 | A1* | 2/2013 | Cholewa | H01R 4/023 174/257 |
| 2014/0110166 | A1* | 4/2014 | Degen | H05B 3/84 174/84 R |
| 2014/0158424 | A1* | 6/2014 | Schlarb | B23K 1/0008 174/94 R |
| 2014/0182932 | A1* | 7/2014 | Cholewa | H05B 3/84 174/84 R |
| 2015/0236431 | A1* | 8/2015 | Schmalbuch | H01R 4/187 174/252 |

FOREIGN PATENT DOCUMENTS

| | | | | |
|---|---|---|---|---|
| DE | 695 30 806 T3 | 7/2007 | | B60J 1/00 |
| EP | 0 671 864 A2 | 9/1995 | | B60J 1/00 |
| EP | 2 209 161 A1 | 7/2010 | | H01R 4/02 |
| WO | WO 2013/004434 A1 | 1/2013 | | B23K 1/00 |

OTHER PUBLICATIONS

The Written Opinion of the International Searching Authority, in English (dated Nov. 29, 2016—mailed with the English translation of the International Preliminary Report on Patentability), which was issued by the International Bureau of WIPO in Applicant's corresponding international PCT application having Serial No. PCT/EP2015/061207, filed on May 21, 2015.

The International Search Report, in English, dated Jul. 24, 2015, which was issued by the International Bureau of WIPO in Applicant's corresponding international PCT application having Serial No. PCT/EP2015/061207, filed on May 21, 2015.

* cited by examiner

ELECTRICAL CONNECTION ELEMENT FOR FASTENING, IN PARTICULAR SOLDERING, TO A GLASS PANE, AND RIBBON LITZ WIRE MIXED BRAID

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to an electrical connection element for fastening, in particular soldering, to a glass pane and conductive sections present there, in particular to a vehicle pane, consisting of a solder connection part and a ribbon litz wire section fixed to the solder connection part by welding, according to the claims, and a ribbon litz wire mixed braid for an electrical connection element, especially such a one that is capable for fastening to a glass pane and conductive sections present there, according to the claims.

(2) Description of Related Art

An electrical connection element for a heated vehicle pane is known from the prior art from DE 691 02 964 T2. The connection element is used for producing an electrical connection to a conductive layer arranged on the motor-vehicle glass pane and comprises a flexible wire strand section and a plug arranged at an end of the wire strand and a solder connection part situated at the opposite end.

According to DE 691 02 964 T2, the flexible wire strand section consists of a copper fabric tape for example having an approximately rectangular cross-section. A tongue-shaped flat plug is welded to an end of the wire strand section, onto which a respective flat-plug coupling can be inserted during connection to the on-board network.

The further end region of the wire strand section is connected to a rigid sheet-metal part, which occurs by a welding process. Said sheet-metal part forms the actual solder foot. This can concern a sheet-metal section whose width and length is adjusted to the respective requirements.

The sheet-metal section consists of copper sheet for example. The solder connection part can comprise a bent portion, especially a bent metal part, in order to form a deformable bridge which removes the thermal tensions produced by the different thermal expansion of the glass and the sheet-metal part that is soldered onto said glass.

Since the solder connection part consists of copper, this leads to the disadvantage that the expansion under a change in temperature acts differently than the expansion of the respective glass pane. In order to reduce the mechanical stress that is caused in this manner, lead-containing ductile solder alloys were mainly used until now for connecting the solder connection part to the glass pane.

In order to meet the requirements concerning the avoidance of lead-containing solders, solder materials are increasingly used which have a similar or identical coefficient of expansion than the glass itself.

The use of lead-free solder materials requires new approaches for forming electrical connections with the respective consequences and effects in the technological sequence and in the production processes. If materials are used concerning the solder connection parts which have a different melting point than copper and respective spot welded connections are used, there is a likelihood that as a result of the temperatures which occur during welding or are required for the welding process the materials of the wire strand, i.e. the ribbon conductor, are subjected to an excessively high thermal loading, especially that they burn out and become brittle. Such brittleness of the ribbon litz wire significantly decreases the strength of the electrical connection element.

BRIEF SUMMARY OF THE INVENTION

On the basis of the statements made above, it is the object of the invention to provide a further developed electrical connection element for fastening, especially soldering, to a glass pane and the conductive sections present there, especially on a vehicle glass pane, wherein the connection element consists of a solder connection part and a ribbon litz wire section which is fixed to the solder connection part by welding. The electrical connection element shall offer sufficient electrical conductivity on the one hand and meet the requirements caused by technology on the other hand, especially in a thermal respect, without causing any significant impairment in the tensile strength and further mechanical properties.

This object of the invention is achieved by an electrical connection element according to the combination of features according to the claims and by means of a ribbon litz wire mixed braid according to the combination of features according to the claims, wherein the dependent claims at least form appropriate embodiments and further developments.

BRIEF DESCRIPTION OF THE SEVERAL VIEWS OF THE DRAWINGS(S)

Not Applicable

DETAILED DESCRIPTION OF THE INVENTION

An electrical connection element for fastening, especially soldering, to a glass pane and conductive sections present there is considered. The glass pane especially concerns a vehicle glass pane. The electrical connection element consists of a solder connection part and a ribbon litz wire section fixed to the solder connection part by welding.

The end of the ribbon litz wire section which is opposite the solder connection part can be connected to a further electrical connection element such as a flat plug or a flat-plug socket in the known manner.

In accordance with the invention, the ribbon litz wire section, i.e. the ribbon litz wire conductor, consists of a mixed braid.

In addition to single wires made of copper or a copper alloy, said mixed braid contains a quantity of single wires made of such a material which has a melting temperature that substantially corresponds to the melting temperature of the solder connection part or has a melting temperature which is respectively higher.

Especially when the solder connection part is connected to the ribbon litz wire section by resistance welding with a respective thermal load, the quantity of single wires with a melting temperature which is higher in comparison with copper assumes the task of maintaining the tensile strength of the ribbon litz wire conductor. As a result, the occurring burning out of individual copper wires, which still need to be provided advantageously for electrical reasons, does not have a disadvantageous effect on the desired mechanical properties of the ribbon litz wire conductor.

In accordance with the invention, the mixed braid comprises single wires made of high-grade steel, especially ferritic chromium steel.

This can concern single wires made of $X_6Cr_{17}$ material.

The proportion of the single wires with adjusted melting temperature in the braid lies in the range of substantially between 15% and up to 85%, preferably in the range of between 40% and 60%.

In one embodiment, the solder connection part is formed as a bridge with at least one elevated section, which has a predetermined distance in the mounted state from the glass pane.

According to a further problem-solving approach in accordance with the invention, the solder connection part consists of a steel alloy, i.e. such an alloy which is best suitable with respect to the coefficient of expansion for lead-free soldering onto the pane.

A ribbon litz wire mixed braid for an electrical connection element is further provided in accordance with the invention, consisting of electrically highly conductive single wires and single wires which have a high tensile strength. Said mixed braid is thus an excellent electrical conductor with optimal tensile strength properties. As a result of the tight connection of the single wires which is usually produced in a braid by the weaving technology, a new material is produced which can be used with wide functionality and which survives both high temperature loads during welding on the one hand, but can also be processed in a classical manner on the other hand.

The single wires of the ribbon litz wire mixed braid at least comprise the materials of copper and high-grade steel.

The proportion of the single wire made of high-grade steel substantially lies in the range of 15% up to 85% relating to the total number of the wires of the braid.

In a further embodiment of the invention, the single wires can consist of a hybrid material which comprises both the desired electrical as well as mechanical properties, and especially has such properties which lead to the consequence that under thermal loading, especially by welding, the desired and required tensile strength values are maintained.

The invention will be explained below in closer detail by reference to an embodiment.

Known electrical connection elements for vehicle glass panes consist of the actual solder object and solder alloy as well as the ribbon litz wires and an interface to the on-board electronic system, which is formed for example as a classical 6.3 mm flat plug according to DIN 46244. The solder object and the ribbon litz wires as well as the ribbon litz wires and the interface to the on-board electronic system can be connected by means of electrical resistance welding.

A respective current is applied to the materials to be connected during resistance welding. Heat is generated at the points where there is electrical resistance. The greatest points of resistance consist on the one hand at the transition point from the copper braid to the solder object and on the other hand at the locations where the electrodes of the resistance welding arrangement touch the materials. Resistance welding of different materials can lead to the difficulties described in the introduction to the description.

In accordance with the embodiment, the configuration of the braid is now changed. Individual copper wires are no longer weaved into a ribbon litz wire conductor. Instead, single wires are inserted which have a similar melting temperature as the solder object such as high-grade steel. Furthermore, individual copper wires are included in the mixed braid.

During the welding of the braid according to the embodiment with the solder object, which has a coefficient of expansion adjusted to the glass pane, damage still occurs at least partly in the copper strands or copper wires as a result of the high input of energy. However, this damage to the copper material in a mechanical respect is compensated by the part of the braid which consists of the single wires of the second material, e.g. high-grade steel. An increased tensile strength of the weld point is thus generally achieved.

It was determined as a result of performed tests that the braid consists 15% to 85%, preferably 40% to 60%, of single wires of the second material, preferably high-grade steel 1.4016, in order to obtain the advantages in the welding of the braid onto a solder object made of a material with a coefficient of expansion adjusted to glass. Although the required higher input of energy for maintaining the welded connection allows individual copper wires to burn out, this does not influence the properties of the individual high-grade steel wires. This significantly increases the tensile strength of the entire arrangement and does not lie at values beneath 100 N, as is the case in pure ribbon litz wire conductors made of copper.

What is claimed is:

1. An electrical connection element for fastening to a glass pane and conductive sections present there consisting of a solder connection part and a ribbon litz wire section fixed to the solder connection part by resistance welding, characterized in that
    the ribbon litz wire section consists of a mixed braid which, in addition to single wires made of copper or a copper alloy, contains single wires made of a material which has a melting temperature that corresponds substantially to the melting temperature of the solder connection part or has a higher melting temperature than the latter.

2. An electrical connection element according to claim 1, characterized in that the mixed braid comprises single wires made of high-grade steel.

3. An electrical connection element according to claim 2, characterized in that the single high-grade steel wires consist of $X_6Cr_{17}$ material.

4. An electrical connection element according to claim 2, wherein at least one of the single wires is made of ferritic chromium steel.

5. An electrical connection element according to claim 1, characterized in that the proportion of single wires with adjusted melting temperature in the braid lies in the range of between substantially 15% up to 85%.

6. An electrical connection element according to claim 1, characterized in that the solder connection part is formed as a bridge.

7. An electrical connection element according to claim 1, characterized in that the solder connection part consists of a steel alloy or a material with a coefficient of expansion adjusted to the glass pane.

8. An electrical connection element according to claim 1, wherein the electrical connection element is soldered to the glass pane.

9. An electrical connection element according to claim 1, wherein the electrical connection element is soldered to a vehicle pane.

10. An electrical connection element according to claim 1, characterized in the proportion of single wires with adjusted melting temperature in the braid lies in the range of between substantially 40% up to 60%.

11. A ribbon litz wire mixed braid for an electrical connection element, the electrical connection element comprising a solder connection part, the ribbon litz wire mixed braid being fixed to the solder connection part by resistance welding, the ribbon litz wire mixed braid consisting of single wires with high electrical conductivity as well as single wires which have a high tensile strength.

12. A ribbon litz wire mixed braid according to claim 11, characterized in that said single wires consist of copper and high-grade steel.

13. A ribbon litz wire mixed braid according to claim 11, characterized in that the single wires consist of a hybrid material.

14. A ribbon litz wire mixed braid according to claim 12, characterized in that the proportion of the single wires made of high-grade steel is substantially 15% up to 85% relating to the total number of the wires in the braid.

* * * * *